US011854522B2

(12) United States Patent
Su et al.

(10) Patent No.: US 11,854,522 B2
(45) Date of Patent: *Dec. 26, 2023

(54) SOUND ABSORBING STRUCTURE HAVING ONE OR MORE ACOUSTIC SCATTERERS ATTACHED TO A TRANSPARENT PANEL

(71) Applicants: Toyota Motor Engineering & Manufacturing North America, Inc., Plano, TX (US); Toyota Jidosha Kabushiki Kaisha, Toyota (JP)

(72) Inventors: Xiaoshi Su, Ann Arbor, MI (US); Debasish Banerjee, Ann Arbor, MI (US); Tomohiro Miwa, Toyota (JP); Yasushi Hirata, Nagakute (JP); Reimi Emoto, Nagoya (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 339 days.

This patent is subject to a terminal disclaimer.

(21) Appl. No.: 17/172,670

(22) Filed: Feb. 10, 2021

(65) Prior Publication Data

US 2022/0148555 A1 May 12, 2022

Related U.S. Application Data

(60) Provisional application No. 63/111,911, filed on Nov. 10, 2020.

(51) Int. Cl.
*G10K 11/172* (2006.01)
*G10K 11/162* (2006.01)
(Continued)

(52) U.S. Cl.
CPC ........ *G10K 11/172* (2013.01); *B60R 13/0815* (2013.01); *E04B 1/86* (2013.01);
(Continued)

(58) Field of Classification Search
CPC .... G10K 11/172; G10K 11/162; G10K 11/20; G10K 11/02; G10K 11/04; G10K 11/16;
(Continued)

(56) References Cited

U.S. PATENT DOCUMENTS 4,226,299 A * 10/1980 Hansen ..................... E04B 1/86
181/295
6,167,985 B1 * 1/2001 Van Ligten .......... G10K 11/172
181/286

(Continued)

OTHER PUBLICATIONS

Machine Translation of CN-107245963-B. Inventor: Cui, et al. Title:"A sound barrier based on Bragg scattering phonon crystal" (Year: 2019).*

(Continued)

*Primary Examiner* — Shawki S Ismail
*Assistant Examiner* — Jennifer B. Olson
(74) *Attorney, Agent, or Firm* — Christopher G. Darrow; Darrow Mustafa PC

(57) ABSTRACT

A sound absorbing structure includes a panel having a first side and a second side and at least one acoustic scatterer coupled to a first side of the panel. The panel may be at least partially transparent. The at least one acoustic scatterer has an opening and at least one channel. The at least one channel has a channel open end and a channel terminal end with the channel open end being in fluid communication with the opening. The panel may be utilized to separate an interior space from an exterior space.

18 Claims, 5 Drawing Sheets

(51) Int. Cl.
*B60R 13/08* (2006.01)
*E04B 1/86* (2006.01)
*E04B 1/84* (2006.01)

(52) U.S. Cl.
CPC ...... *G10K 11/162* (2013.01); *E04B 2001/849* (2013.01); *E04B 2001/8414* (2013.01)

(58) Field of Classification Search
CPC .............. B60R 13/0815; E04B 1/84; E04B 2001/8414; E04B 2001/849; E04B 2001/8428; E04B 2001/8433; E04B 2001/8438; E04B 2001/8476; E04B 2001/848; E04B 2001/8485; E04B 1/8409; E40B 1/8409; E01F 8/0047; E01F 8/0052; E01F 8/0023; E01F 8/0035; E01F 8/0094; E01F 8/00; E01F 8/0005; B64F 1/26
USPC .............................. 181/286, 288, 293, 210
See application file for complete search history.

(56) References Cited

U.S. PATENT DOCUMENTS

| | | | | |
|---|---|---|---|---|
| 8,251,175 | B1* | 8/2012 | Englert | E04B 9/045 |
| | | | | 52/145 |
| 9,765,516 | B2* | 9/2017 | Van Dinther | E04B 1/8209 |
| 10,399,134 | B2* | 9/2019 | Fan | B21D 13/02 |
| 11,545,128 | B2* | 1/2023 | Su | G10K 11/162 |
| 11,555,280 | B2* | 1/2023 | Su | E01F 8/0047 |
| 2002/0017426 | A1* | 2/2002 | Takahashi | G10K 11/172 |
| | | | | 181/284 |

OTHER PUBLICATIONS

Long et al., "Multiband quasi-perfect low-frequency sound absorber based on double channel Mie resonator," Appl. Phys. Lett. 112, 033507, 7 pages (2018).

Lee et al., "Ultrasparse Acoustic Absorbers Enabling Fluid Flow and Visible-Light Controls," Physical Review Applied 11, 024022, 14 pages (2019).

Elliott et al., "Omnidirectional acoustic absorber with a porous core and a metamaterial matching layer," Journal of Applied Physics 115, 15 pages, 204902 (2014).

Liang et al., "Extreme acoustic metamaterial by coiling up space," Phys. Rev. Lett. 108, 114301, 4 pages (2012).

Cheng et al., "Ultra-sparse metasurface for high reflection of low frequency sound based on artificial Mie resonances," Nat. Mater. 14, 8 pages (2015).

Ghaffarivardavagh et al., "Ultra-open acoustic metamaterial silencer based on Fano-like interference," Phys. Rev. B 99, 024302, 10 pages (2019).

Schwan et al., "Sound absorption and reflection from a resonant metasurface: Homogenisation model with experimental validation," Wave Motion 72 (2017) 154-172.

* cited by examiner

SOUND ABSORBING STRUCTURE HAVING ONE OR MORE ACOUSTIC SCATTERERS ATTACHED TO A TRANSPARENT PANEL

CROSS-REFERENCE TO RELATED APPLICATION

This application claims the benefit of U.S. Provisional Patent Application No. 63/111,911, entitled "SOUND ABSORBING STRUCTURE HAVING ONE OR MORE ACOUSTIC SCATTERERS ATTACHED TO A TRANSPARENT PANEL," filed Nov. 10, 2020, which is incorporated by reference herein in its entirety.

TECHNICAL FIELD

The present disclosure relates to sound absorbing structures that absorb sound and improve sound transmission loss and, more specifically, to sound absorbing structures that include one or more scatterers attached to a transparent panel.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Low-frequency noise-related issues are common in a variety of different environments. For example, noise generated from rapidly moving traffic on a highway, the takeoff and landing of large airplanes at an airport, the movement of rail freight on a railroad, and the like create significant amounts of low-frequency noise. There are several different solutions for managing low-frequency noises, but many have drawbacks. For example, conventional porous sound absorbing materials are only efficient for high-frequency noise reduction due to its high impedance nature. The sound transmission through porous materials is high if the material microstructure has a large porosity.

Additionally, the sound isolation performance using these materials is limited by the so-called "mass-law." The "mass-law" states that doubling the mass per unit area increases the sound transmission loss ("STL") by six decibels. Similarly, doubling the frequency increases the STL by six decibels. This effect makes it difficult to isolate low-frequency sound using lightweight materials. In order to achieve high STL, one may either reflect or absorb the sound energy. However, achieving high absorption and high STL at the same time is also difficult because high absorption usually requires impedance matching, which leads to high transmission.

SUMMARY

This section generally summarizes the disclosure and is not a comprehensive disclosure of its full scope or all its features.

Examples of sound absorbing structures are described herein. In one embodiment, a sound absorbing structure includes a panel having a first side and a second side and at least one acoustic scatterer coupled to a first side of the panel. The panel may be at least partially transparent. The at least one acoustic scatterer has an opening and at least one channel. The at least one channel has a channel open end and a channel terminal end with the channel open end being in fluid communication with the opening.

In another embodiment, a system from reducing noise includes a panel at least partially separating an interior space from an exterior space. In one example, the panel may be used as a window for a vehicle that separates the cabin of the vehicle from the outside environment. The panel may be at least partially transparent. The at least one acoustic scatterer has an opening and at least one channel. The at least one channel has a channel open end and a channel terminal end with the channel open end being in fluid communication with the opening.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The present teachings will become more fully understood from the detailed description and the accompanying drawings, wherein.

The figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present teachings provide a sound absorbing structure that may include an array of acoustic scatterers, which may be referred to as half scatterers, coupled to a panel, which may be at least partially transparent. This arrangement may achieve high STL beyond the "mass-law" and total acoustic absorption at the same time. The panel may be transparent or partially transparent. In one example, the panel may be made of glass.

The sound absorbing structure described in this disclosure may achieve high sound absorption and yet, at the same time, be relatively thin. Moreover, in one example, the sound absorbing structure may have a thickness of only $\frac{1}{16}$ of the wavelength and can achieve total acoustic absorption. In addition, the sound absorbing structure can essentially break the "mass-law" near the resonant frequency of the acoustic scatterer. At the resonant frequency, the effective mass density of the sound absorbing structure becomes negative so that the sound speed, as well as the wavenumber in the material, becomes imaginary. The imaginary wavenumber indicates that the wave is exponentially decaying in the material. Also, the impedance of the material is matched to air at the same frequency so that there is no reflection. As a result, all the energy may be absorbed, and hence the STL is higher than the mass-law within a certain frequency band.

Moreover, the sound projected to the sound absorbing structure is at least partially reflected by the panel without a phase change. The acoustic scatterer behaves like a monopole source at a certain distance from the panel, and its mirror image radiates a monopole moment as well. The two monopoles form a new plane wave having a direct reflection from the panel with a 180° phase difference. As such, the wave reflected by the panel is essentially canceled out by the new plane wave, thus absorbing the projected sound.

With regards to the design of the sound absorbing structure, the sound absorbing structure may include a panel that has at least one acoustic scatterer attached to the panel. The acoustic scatterer may have a housing that defines one or more channels with an open end and a terminal end. The housing of the acoustic scatterer also has an opening that is in fluid communication with the open end of the channel.

Figure 1:
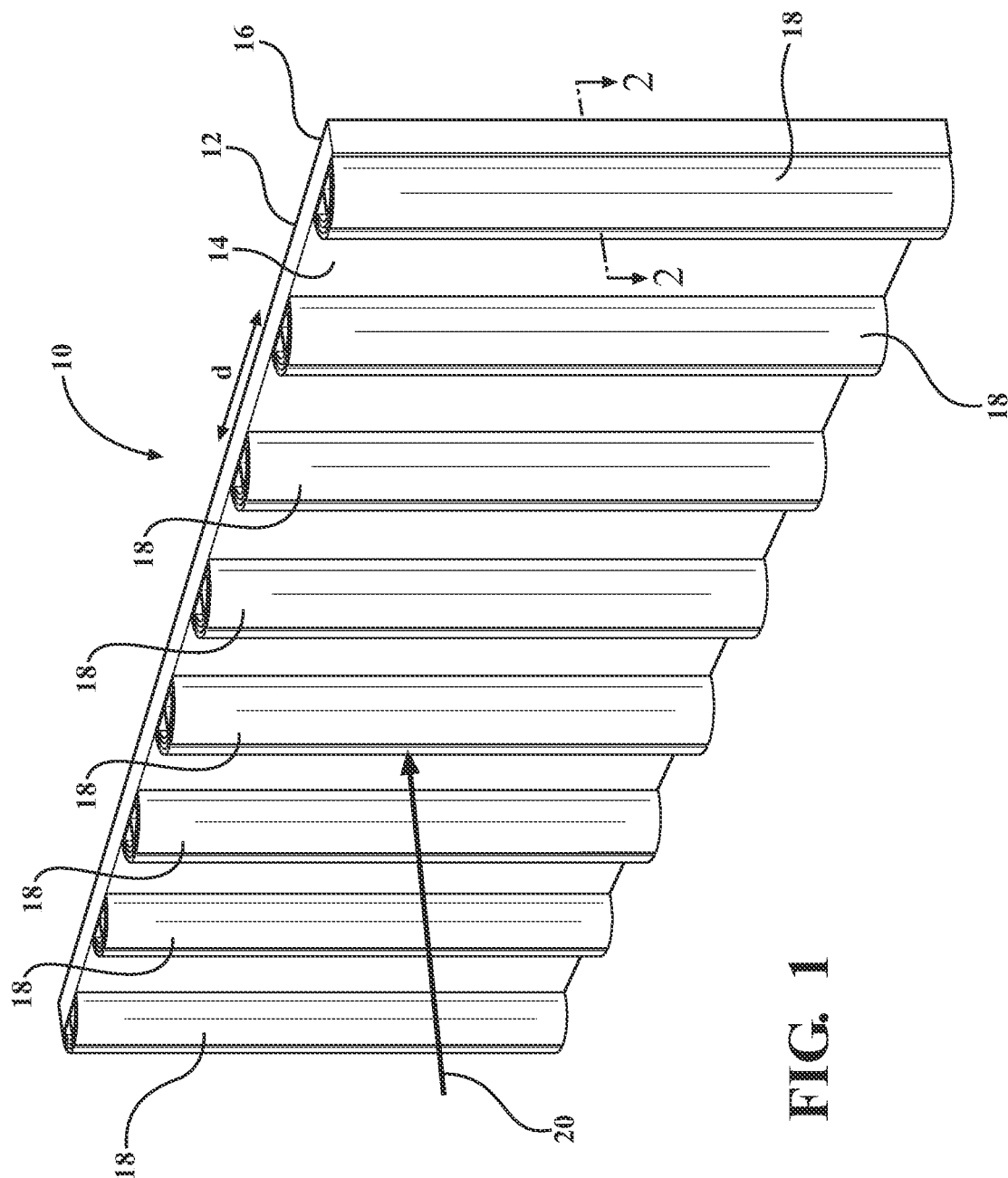
FIG. 1 illustrates a sound absorbing structure for absorbing sound and improving sound transmission loss utilizing a plurality of acoustic scatterers mounted to a panel.

Referring to FIG. 1, a sound absorbing structure 10 is shown. The sound absorbing structure includes a panel 12 having a first side 14 and a second side 16. The panel 12 may be made of transparent or semi-transparent acoustically hard material, such as glass, plastics, such as polymethyl methacrylate, and the like.

Connected to the first side 14 of the panel 12 are a plurality of acoustic scatterers 18, which may be referred to as half scatterers in this disclosure. The plurality of acoustic scatterers 18 form an array. The acoustic scatterers 18 are separated from each other by a distance of d. It should be understood that the acoustic scatterers 18 and the panel 12 may be a unitary structure or may utilize one of several different methodologies to connect the acoustic scatterers 18 to the panel 12. In one example, the acoustic scatterers 18 may be adhered to the panel 12 using an adhesive, but other types of methodologies to connect the acoustic scatterers 18 to the panel 12 may be utilized, such as mechanical devices like screws, bolts, clips, and the like. Alternatively, the acoustic scatters 18 and the panel 12 may be formed as a unitary structure. The acoustic scatterers 18 may be made of an acoustically hard material, such as concrete, metal, glass, wood, plastic, combinations thereof, and the like. In one example, the acoustic scatterers 18 may be transparent or semi-transparent and may be made of the same material as the panel 12.

Each of the acoustic scatterers 18 have a resonant frequency. The resonant frequency of each of the acoustic scatterers 18 may be the same resonant frequency or may be different resonant frequencies. Sound absorbed by the sound absorbing structure 10, as will be explained later, substantially matches the resonant frequency of the acoustic scatterers 18. By utilizing acoustic scatterers having different resonant frequencies, a wider range of sounds with different frequencies can be absorbed by the sound absorbing structure 10.

In this example, a total of eight acoustic scatterers 18 are attached to the panel 12. However, it should be understood that any number of acoustic scatterers 18 may be utilized. In some examples, only one acoustic scatterer 18 may be utilized, while, in other examples, numerous acoustic scatterers 18 may be utilized.

As stated before, projected sound 20, which may also be referred to as a noise, may originate from any one of several different sources or combinations thereof. For example, the source of the projected sound 20 may originate from a speaker, vehicle, aircraft, watercraft, train, and the like. Again, it should be understood that the sound absorbing structure 10 can be used in any situation where it is desirable to eliminate or reduce sounds of certain frequencies. The incidence angle of sound waves, such as the projected sound 20, absorbed by the sound absorbing structure varies based on the distance between a plurality of acoustic scatterers.

As stated before, the projected sound 20 is at least partially reflected by the panel 12 without a phase change. The acoustic scatterers 18 behave like a monopole source at a certain distance from the panel 12, and its mirror image radiates a monopole moment as well. The two monopoles form a new plane wave having a direct reflection from the panel with a 180° phase difference. As such, the wave reflected by the panel 12 is essentially canceled out by the new plane wave, thus absorbing the projected sound.

The absorption performance of the sound absorbing structure 10 may be incident angle dependent. The sound absorbing structure 10 and acoustic scatterers 18 disclosed in this disclosure operate over a relatively wide range of incidence. Total absorption can still be achieved for 30-degree and 45-degree incidence. However, high order diffraction modes will start to propagate with the increase of the incident angle. This phenomenon will change the absorption performance. When the high order diffraction modes exist at the scatterer resonant frequency, and the incident angle is sufficiently large, then the sound absorbing structure 10 may not achieve total absorption. The disclosed design is tunable so that the spacing between acoustic scatterers 18 can be reduced, and hence increase the working angle.

Another benefit of the acoustic scatterer design disclosed in this disclosure is that the acoustic scatterers 18 are separated from each other, so there may be ample space to combine one design with another to cover more frequencies. For example, acoustic scatterers 18 with different resonant frequencies can be utilized to absorb and improve STL across a wider range of frequencies. The resonant frequency is tuned by adjusting the size of the acoustic scatterer 18 and the channel and/or cavity, as well as the width and length of the air channel. Different acoustic scatterer designs may then be combined to achieve broadband performance.

The space between the acoustic scatterers 18 of the sound absorbing structure 10 can be tuned. The benefit of tunable spacing is that one can choose between sparsity and the working angle of the material. By reducing the space, the performance of the sound absorbing structure 10 will be less sensitive to the incident angle of the wave.

Figure 2A:
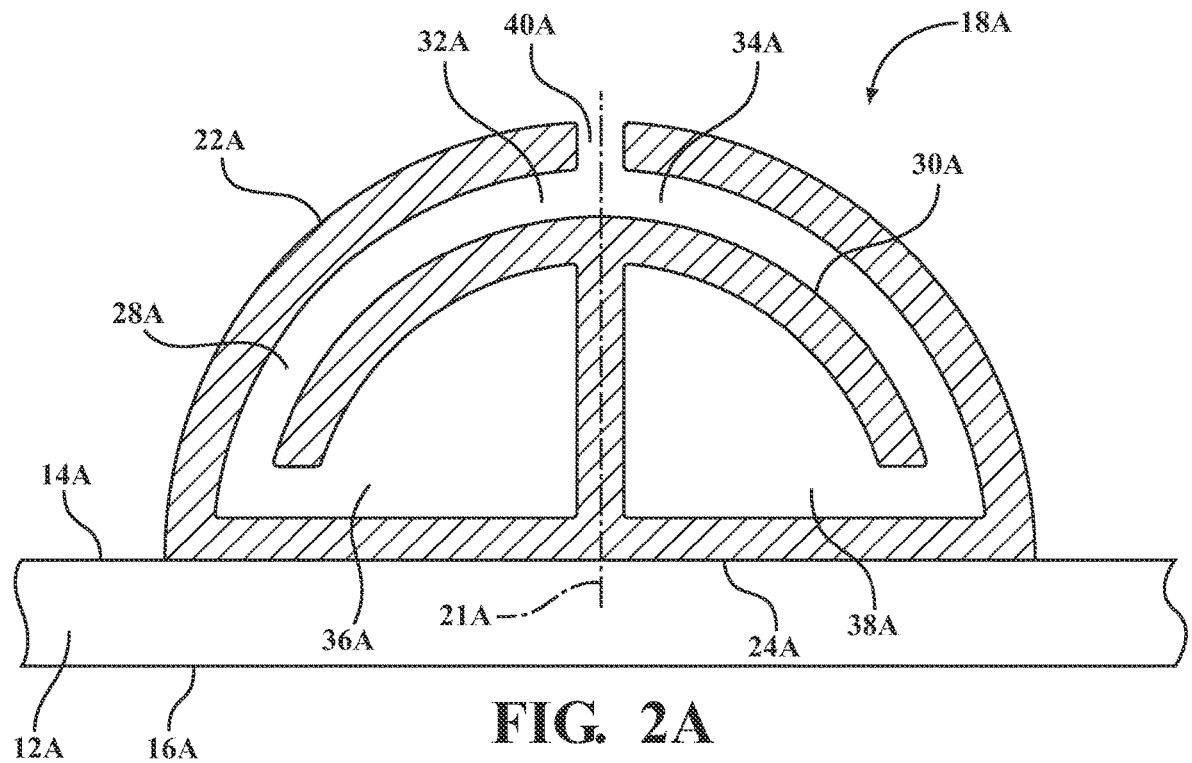
FIGS. 2A and 2B illustrate cross-sectional views, generally taken along lines 2-2 of FIG. 1, of different examples of scatters used by the sound absorbing structure of FIG. 1.

The acoustic scatterers 18 of FIG. 1 can take any one of several different forms. For example, FIG. 2A illustrates a cross-sectional view of one example of an acoustic scatterer 18A, generally taken along lines 2-2 of FIG. 1. This is just but one example of the design of the acoustic scatterer 18A. Here, the acoustic scatterer 18A is generally in the shape of a half-cylinder. The half-cylinder shape of the acoustic scatterer 18A includes a substantially semicircular portion 22A and a substantially flat portion 24A. The substantially flat portion 24A may be attached to the panel 12A shown in FIG. 1. Additionally, as stated before, the acoustic scatterer 18A and the panel 12A shown in FIG. 1 may be a unitary structure or may be connected to each other using the previously mentioned methodologies. It should be understood that the semicircular portion 22A may take any one of several different shapes. These shapes may be non-planar, but any suitable shape may be utilized.

The acoustic scatterer 18A may be made of any one of several different materials. Like before, the acoustic scatterer 18A may be made of an acoustically hard material, such as concrete, metal, glass, wood, plastic, combinations thereof, and the like. In one example, the acoustic scatterer 18A may be transparent or semi-transparent and may be made of the same material as the panel 12A.

The overall shape of the acoustic scatterer 18A is substantially uniform along the length of the acoustic scatterer 18A. In this example, the acoustic scatterer 18A may include a first channel 28A that has an open end 32A and a terminal end 36A. The acoustic scatterer 18A may also include a second channel 30A that has an open end 34A and a terminal end 38A. The open ends 32A and 34A may be in fluid communication with an opening 40A formed on the semicircular portion 22A of the acoustic scatterer 18A. The opening 40A may be directly adjacent to the open end 32A and/or the open end 34A. The opening 40A may be adjacent to a line of symmetry 21A of the acoustic scatterer 18A. As to the terminal ends 36A and 38A, these ends are separated from each other and are not in fluid communication with each other. The terminal ends 36A and 38A may terminate in any one of several different shapes. Moreover, the terminal ends 36A and 38A may terminate in the form of a chamber or may terminate in the form of a closed off channel.

The channels 28A and 30A may have a circumferential type shape that generally follows the circumference defined by the semicircular portion 22A. The opening 26A may have a width that is substantially similar to the width of the channels 28A and 30A. However, the widths of the channels may vary considerably.

The acoustic scatterer 18A may have a line of symmetry 21A. In this example, the shape of the first channel 28A is essentially a mirror image of the second channel 30A. In addition, the volumes of the channels 28A and 30A may be substantially equal. "Substantially equal" in this disclosure should be understood to indicate approximately a 10% difference in the overall volume or shape of the channels 28A and 30A. The resonant frequency of the channel(s) may be the same.

It should be understood that the number of channels and the shape of the channels can vary from application to application. In this example described, the acoustic scatterer 118A has two channels—channels 28A and 30A. However, more or fewer channels may be utilized. In the case of multiple channels, the additional channels may have a similar shape to each other with the same channel cross-section area and length and the same cavity volume, similar to the channels 28A and 30A shown.

Figure 2B:
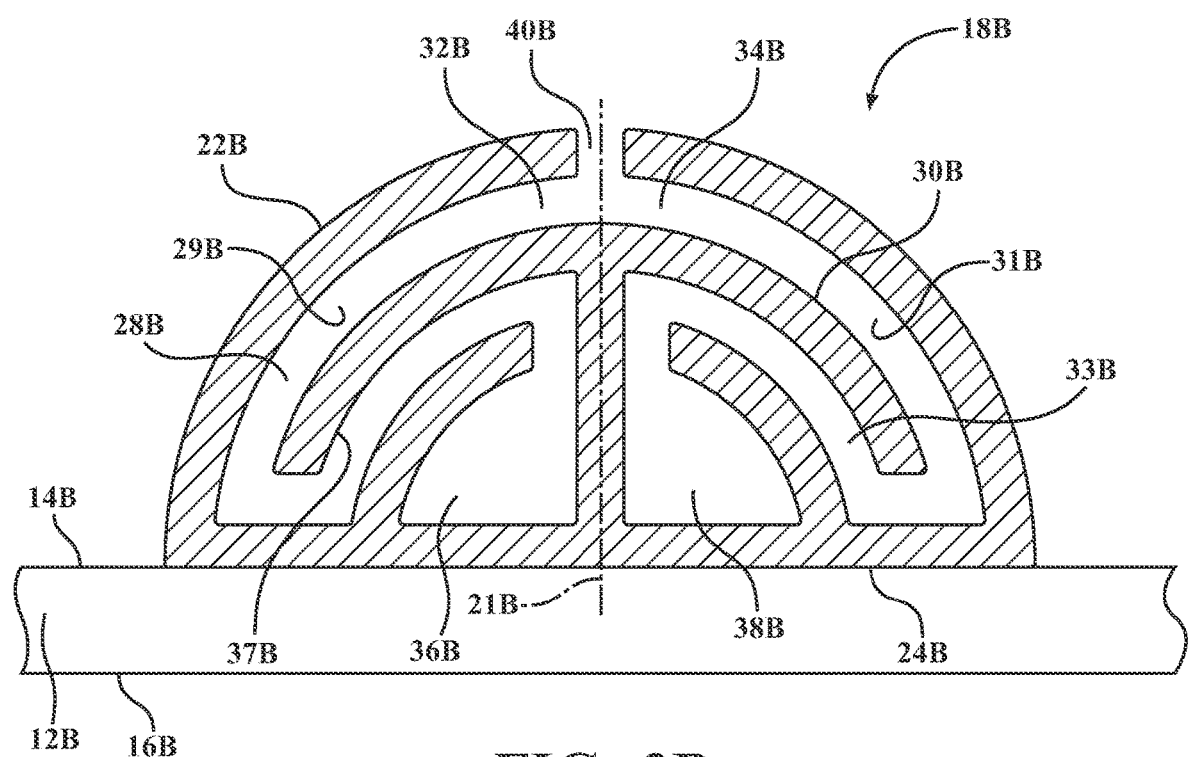

As stated before, the acoustic scatterers 18A of FIG. 1 can take any one of several different shapes. FIG. 2B illustrates another example of an acoustic scatterer 18B. Here, the acoustic scatterer 18B includes a first channel 28B and a second channel 30B. Both the first and second channels 28B and 30B have open ends 32B and 34B, respectively. Also, the first and second channels 28B and 30B have terminal ends 36B and 38B, respectively. The open ends 32B and 34B of the channels 28B and 30B may be in fluid communication with the opening 40B generally formed on the outer circumference 22B of the acoustic scatterer 18B. The opening 40B may be adjacent to a line of symmetry 21B of the acoustic scatterer 18B. The terminal ends 36B and 38B may be in the form of a chamber or may be in the form of a closed off channel.

Like before, the flat side 24B may be attached to the first side 14B of the panel 12B by any one of several different methodologies mention. Additionally, like before, the acoustic scatterer 18B and the panel 12B may be a unitary structure.

In this example, the channel 28B is essentially a zigzag channel. Moreover, the channel 28B includes a first channel 29B and a second channel 37B that generally are parallel to one another and may have similar arcs. The second channel 30B is similar in that it has a first channel 31B and a second channel 33B that generally run parallel to each other and may have similar arcs. However, anyone of several different designs can be utilized.

The acoustic scatterer 18B may also have a line of symmetry 21B. As such, the first channel 28B may essentially be a mirror image of the second channel 30B Likewise, the volume of the first channel 28B may be substantially equal to the volume of the second channel 30B.

The sound absorbing structure 10 can be utilized in any one of several different applications. In particular, because the panel 12 and possibly the acoustic scatterers 18 are transparent or semi-transparent, applications were transparency or semi-transparency are required could be considered.

Figure 3:
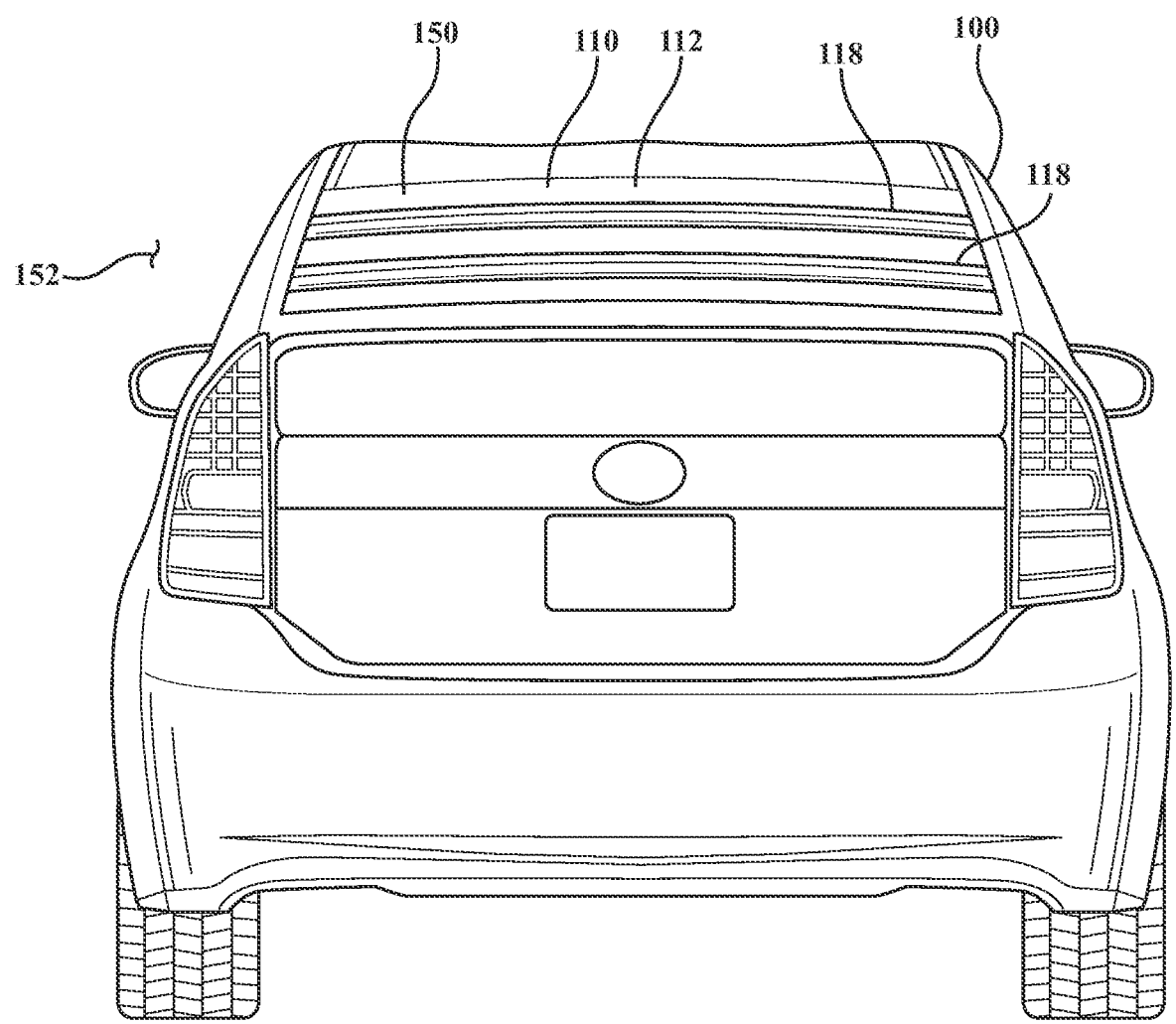
FIG. 3 illustrates one example of the sound absorbing structure being used as a vehicle window.

For example, referring to FIG. 3, a vehicle 100 is shown. In this example, the vehicle 100 has a rear glass panel that has been replaced with a sound absorbing structure 110. As explained previously, the sound absorbing structure 110 includes a panel 112 that may be a transparent or semi-transparent panel. One or more acoustic scatterers 118 are connected to the panel 112. In this example, two acoustic scatterers 118 are shown, but the number of acoustic scatterers can be increased or decreased based on the application and the type of sounds to be absorbed. Additionally, the acoustic scatterers 118 extend horizontally but could extend vertically or in other directions, so long as the acoustic scatterers 118 generally run parallel to each other and maintain the appropriate distance between the acoustic scatterers 118.

The sound absorbing structure 110 can essentially divide an interior space 150 of the vehicle 100 from an exterior space 152, such as the environment that surrounds the vehicle 100. The acoustic scatterers 118 may face outward from the interior space 150 or may face inward towards the interior space 150. In this example, sounds originating from the environment that are near the resonant frequencies of the acoustic scatterers 118 can be minimized by the sound absorbing structure 110. Examples of the sounds to be absorbed could include low-frequency noises, such as the rotation of the tires of the vehicle 100 and/or the movement of powertrain components of the vehicle 100.

Figure 4:
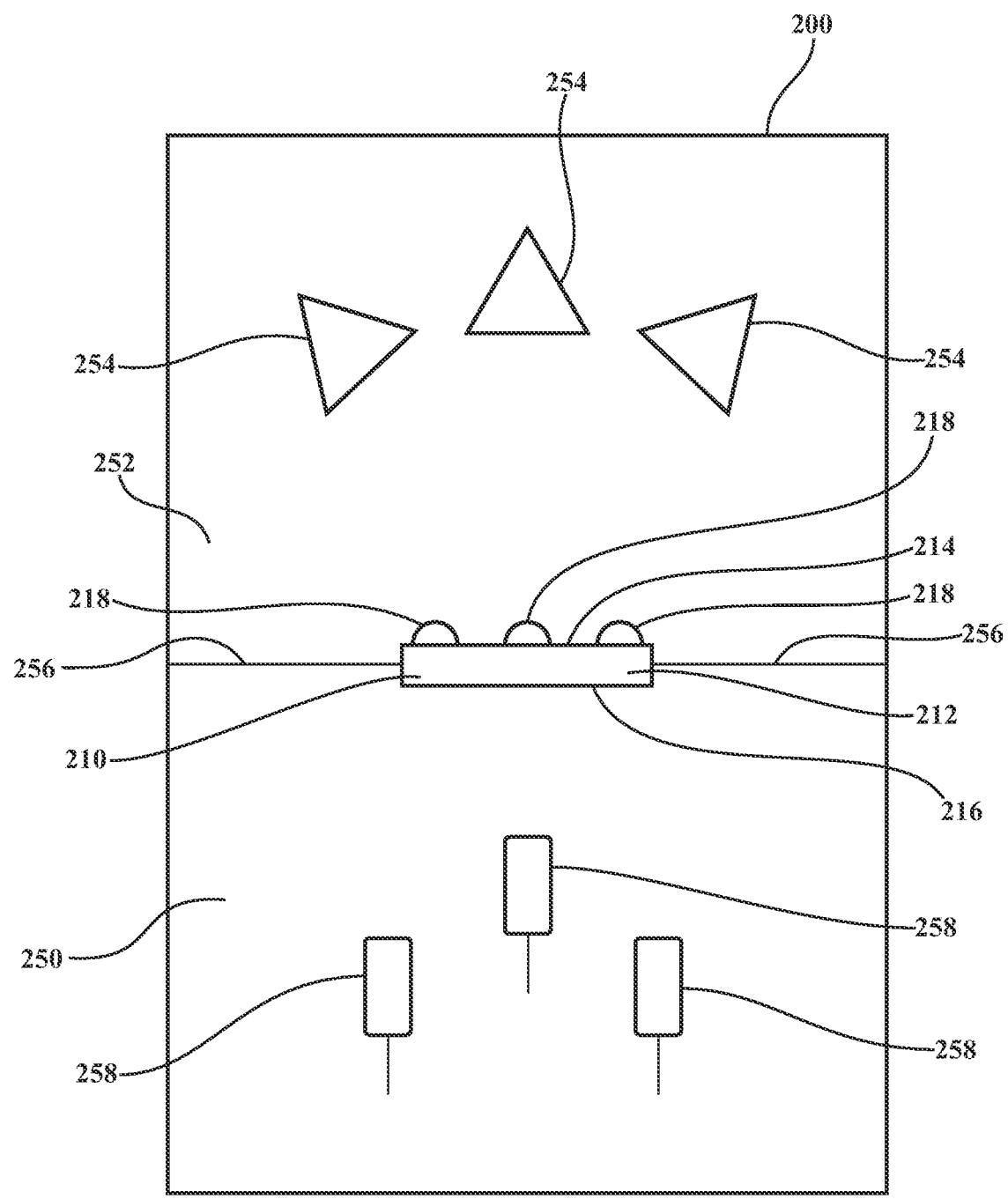
FIG. 4 illustrates one example of the sound absorbing structure being used to separate areas within a building.

As stated before, there are numerous applications for the sound absorbing structure 10. FIG. 4 illustrates another example of a room 200 that may be located within the building. Here, the sound absorbing structure 210 includes a panel 212 that may be transparent or semi-transparent and a plurality of acoustic scatterers 218 connected to a first side 214, opposite the second side 216, of the panel 212. For experimentation purposes, the sound absorbing structure 210 only extends along a portion of the width of the room 200 but may extend across the entire width of the room or just portions thereof. For experimentation reasons, the results of which are shown in FIG. 5, the room 200 also includes glass panels 256 that flank the sound absorbing structure 210, thus dividing the room 200 between a first space 250 and a second space 252.

Additionally, the second space 252 of the room 200 includes speakers 254 that will produce a sound having sound waves. The first space 250 of the room 200 includes one or more microphones 258 that will be utilized to test the sound absorbing capabilities of the sound absorbing structure 210.

Figure 5:
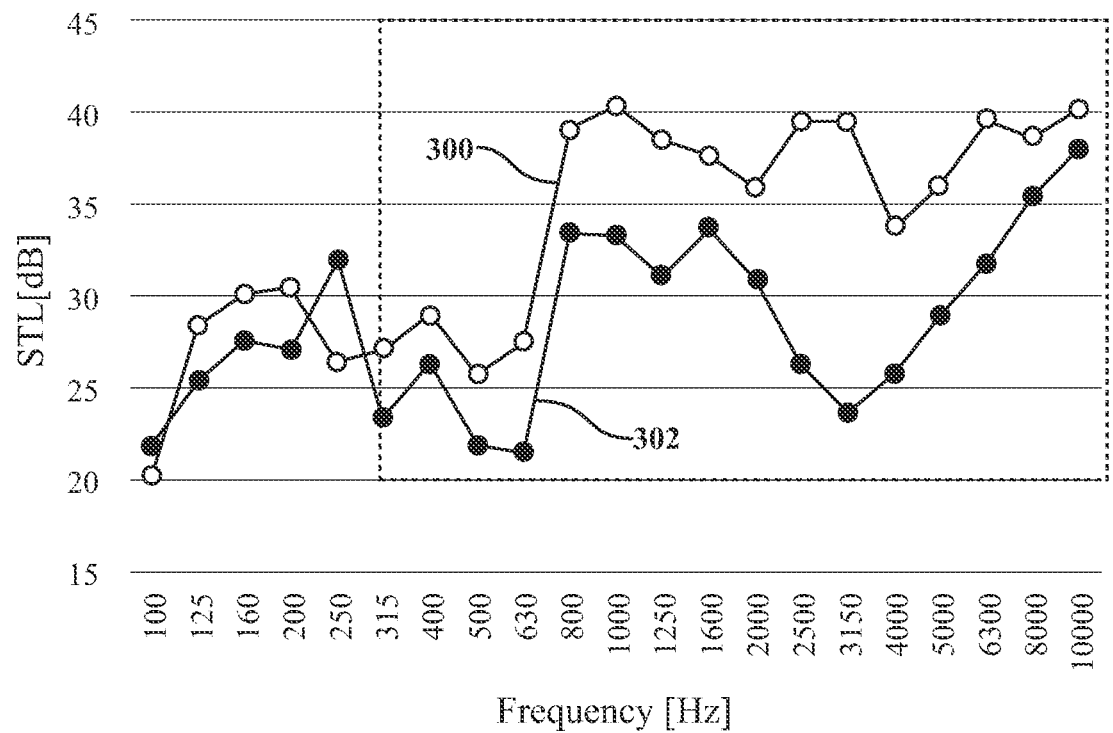
FIG. 5 illustrates a graph illustrating the sound absorbing characteristics of the sound absorbing structure of FIG. 4.

The sound absorbing capabilities of the sound absorbing structure 210 in this situation is shown in FIG. 5. This figure illustrates a chart wherein the y-axis represents a sound transmission loss in decibels, and the x-axis represents the frequency of the sound waves absorbed. The chart illustrates the sound transmission loss 300 performed by the sound absorbing structure 210 and the sound transmission loss 302 performed by the glass panels 256, which do not utilize any acoustic scatterers 218. As shown in this chart, the sound absorbing structure 210 is superior in absorbing sounds across a range of different frequencies. As such, the sound absorbing structure 210 allows the effective absorption of sound across a range of frequencies.

The preceding description is merely illustrative and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sound absorbing structure comprising:
   a panel having a first side and a second side, the first side of the panel being positioned to face a source of a noise, the panel being at least partially transparent;
   at least one acoustic scatterer coupled to the first side of the panel, the at least one acoustic scatterer having a resonant frequency;
   the at least one acoustic scatterer having an opening, a first channel, and a second channel, the volumes of the first channel and the second channel are substantially equal to each other;
   the first channel has a first channel open end and a first channel terminal end, the first channel terminal end forms a first chamber, the first channel open end being in fluid communication with the opening;
   the second channel has a second channel open end and a second channel terminal end, the second channel terminal end forms a second chamber, the second channel open end being in fluid communication with the opening;
   the first channel terminal end and the second channel terminal end are separate from one another; and
   wherein the first channel and the second channel extend parallelly along the length of the at least one acoustic scatterer.

2. The sound absorbing structure of claim 1, wherein the at least one acoustic scatterer has a flat side, the flat side being coupled to the first side of the panel.

3. The sound absorbing structure of claim 2, wherein the at least one acoustic scatterer has a non-planar side, the non-planar side having the opening, the non-planar side substantially facing the source of the noise.

4. The sound absorbing structure of claim 3, wherein the at least one acoustic scatterer has a half-cylinder shape, the half-cylinder shape defining the non-planar side and the flat side.

5. The sound absorbing structure of claim 1, wherein the first channel and the second channel are shaped in a zigzag design.

6. The sound absorbing structure of claim 1, wherein a thickness of the sound absorbing structure has a thickness of approximately 1/16 of a wavelength of a sound wave absorbed by the sound absorbing structure.

7. The sound absorbing structure of claim 1, wherein the at least one acoustic scatterer comprises a plurality of acoustic scatters.

8. The sound absorbing structure of claim 7, wherein the plurality of acoustic scatters includes a first scatterer having a first resonant frequency and a second scatterer having a second resonant frequency.

9. The sound absorbing structure of claim 1, wherein the sound absorbing structure is configured to absorb sound waves at a certain frequency generated by the source of the noise, wherein the certain frequency is substantially similar to the resonant frequency of the at least one acoustic scatterer.

10. The sound absorbing structure of claim 9, wherein the sound absorbing structure is configured to absorb sound waves generated by the source of the noise and projected towards the sound absorbing structure at an incidence angle substantially between 0 degrees and 45 degrees.

11. The sound absorbing structure of claim 10, wherein:
the at least one acoustic scatterer includes a plurality of acoustic scatterers separate from each other by a distance; and
wherein the incidence angle of the sound waves absorbed by the sound absorbing structure varies based on a distance between a plurality of acoustic scatterers.

12. The sound absorbing structure of claim 11, the incidence angle of the sound waves absorbed by the sound absorbing structure increases as a distance between the plurality of acoustic scatterers decreases.

13. The sound absorbing structure of claim 1, wherein the panel is made of a rigid material.

14. The sound absorbing structure of claim 13, wherein the rigid material is glass.

15. A system for reducing noise comprising;
a first space;
a second space,
a panel at least partially separating the first space from the second space, the panel having a first side and a second side and being at least partially transparent;
at least one acoustic scatterer coupled to the first side of the panel, the at least one acoustic scatterer having a resonant frequency;
the at least one acoustic scatterer having an opening, a first channel, and a second channel, the volumes of the first channel and the second channel are substantially equal to each other;
the first channel has a first channel open end and a first channel terminal end, the first channel terminal end forms a first chamber, the first channel open end being in fluid communication with the opening;
the second channel has a second channel open end and a second channel terminal end, the second channel terminal end forms a second chamber the second channel open end being in fluid communication with the opening;
the first channel terminal end and the second channel terminal end are separate from one another; and
wherein the first channel and the second channel extend parallelly along the length of the at least one acoustic scatterer.

16. The system of claim 15, wherein the first space is at least one of: a cabin of a vehicle and a room of a building.

17. The system of claim 15, wherein the at least one acoustic scatterer has a flat side and a non-planar side, the flat side being coupled to the first side of the panel and the non-planar side having the opening.

18. The system of claim 15, wherein the first side of the panel faces the second space.

* * * * *